United States Patent Office 2,776,507
Patented Jan. 8, 1957

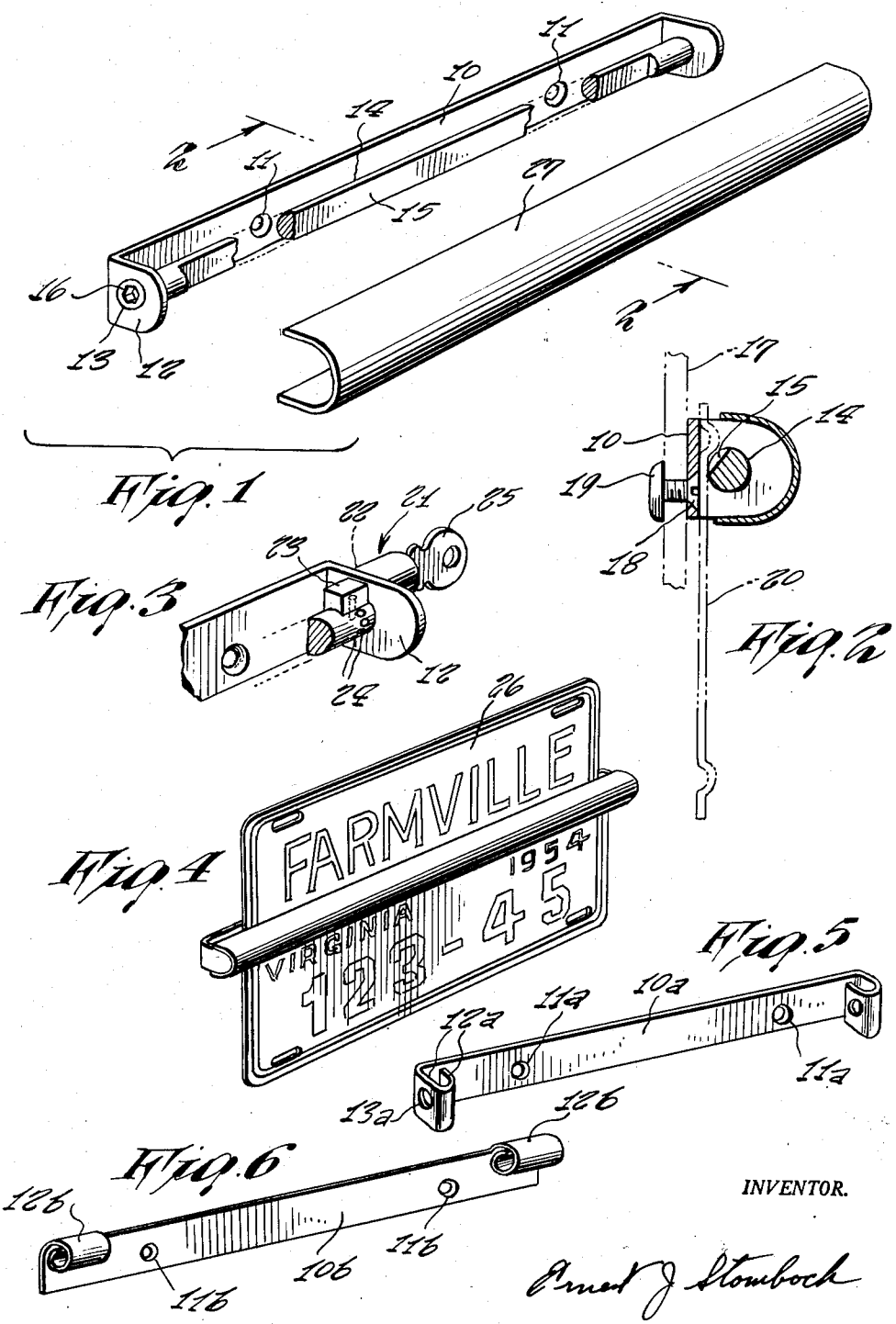
Jan. 8, 1957    E. J. STOMBOCK    2,776,507
LICENSE PLATE LOCK
Filed May 18, 1954
INVENTOR.
Ernest J. Stombock

2,776,507

LICENSE PLATE LOCK

Ernest J. Stombock, Farmville, Va.

Application May 18, 1954, Serial No. 430,559

1 Claim. (Cl. 40—125)

This invention relates to license plate attaching means.

It is an object of the present invention to provide improved license plate attachment means which can be mounted on any flat surface of a car or upon the conventional holder mounted thereon and which will permit the license plates to be attached or removed in a matter of seconds without the requirement of bolts or screws.

It is another object of the present invention to provide license plate attachment means of the above type wherein it is impossible for the license plates to become lost or loose.

It is still another object of the present invention to provide license plate attachment means of the above type which may be locked with a cylinder lock to prevent the plates from being stolen.

Other objects of the present invention are to provide license plate attachment means bearing the above objects in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is an exploded perspective view of the parts comprising the invention;

Fig. 2 is a vertical sectional view taken along the line 2—2 of Fig. 1 and showing the parts of the invention in assembled relation to securely mount therein a conventional license plate;

Fig. 3 is a fragmentary perspective view showing a modified form of the invention wherein a cylinder lock is provided at one end of the device to prevent the plates from becoming stolen;

Fig. 4 is a perspective view showing a town and state plate mounted at the top and bottom of the device, respectively;

Fig. 5 is a perspective view of a modified form of one of the parts of the invention; and Fig. 6 is a perspective view of a still further modified form of the same part of the invention.

Referring now more in detail to the drawing, there is shown in Fig. 1 through Fig. 4, an elongated mounting bracket made up of an elongated strip 10 of metal having the countersunk openings 11 and integrally formed at each end with the end walls 12, substantially as illustrated. The end walls 12 are provided with aligned openings 13 in which is rotatably mounted a cylindrical rod 14 having a flat cut away portion 15, the opposite ends of the rod 14 having the hexagonal openings 16 into which a hexagonal member may be inserted to facilitate the rotational movement of the rod in a manner which will hereinafter become clear.

The bracket 10 is mounted on the flat portion 17 of an auto car body upon the conventional holder for license plates provided thereon by means of the screws 18 and the flat nuts 19 (Fig. 2). The fit between the ends of the rod 14 and the opening 16 in the end walls 12 is such that the rod will retain its position once rotated to such a position by means of the hexagonal opening 16.

When the flat portion 15 of the rod 14 is substantially parallel to and adjacent to the outer face of the bracket 10, sufficient clearance will exist to permit the state license plate 20 to be inserted downwardly to the position of Fig. 2 intermediate the rod and bracket, whereupon the flat portion 15 is rotated away from the bracket to the relative position of Fig. 2 to secure the plate therewithin in the manner shown. To prevent the plate from being stolen, the hexagonal opening 16 may then be filled with lead or the like.

If desired, a cylinder lock 21 may be mounted on the outer face of one of the end walls 12 to raise and lower a detent 22 within a housing 23, the end of the rod 14 then being provided with a plurality of radially spaced openings 24 adapted to cooperate with the detent 22 whereby to lock the rod. A key 25 will permit the lock 21 to be opened by the owner of the car to remove and insert the plates.

As shown in Fig. 4, a town plate 26 may be similarly mounted along with the state plate 20, with the raised horizontal ends thereof in overlapping relation within the device.

A cover 27 of chrome or other suitable material is adapted to fit on to the outer portions of the end walls 12 and to be suitably secured thereto, for example by means of welding. As shown in Fig. 2, it will be noted that the inner longitudinal edges of the cover 27 are freely spaced from the bracket 10 to permit the insertion and removal of the plates 20, 26.

Referring now particularly to Fig. 5, there is shown a modified form of bracket 10a having countersunk openings 11a and double end walls 12a having aligned openings 13a, the double end walls 12a being formed by providing the end portions of increased length and doubling them back upon themselves in freely spaced relationship. This arrangement permits greater tension to be exerted on the rod 14 to prevent accidental rotation thereof.

Referring now particularly to Fig. 6, there is shown another modified form of bracket 10b having countersunk openings 11b and integrally formed along its upper longitudinal edge at each end with the cylindrically bent portions 12b which rotatably mount the opposite ends of the rod 14, the cylindrical portions 12b again providing increased tension to prevent the accidental rotation of the rod.

It will be noted from Fig. 2 that the plates 20, 26 must be removed first before the screws 18 may be removed. It will also be noted that the rod 14 at each end adjacent the inner faces of the end walls 12, 12a, 12b is cut away to accommodate the raised vertical edges of the plates 20, 26.

While various changes may be made in the detail construction, it shall be understood that such changes shall be within the spirit and scope of the present invention as defined by the appended claims.

What I claim as new and desire to protect by Letters Patent of the United States is:

An article of the class described comprising an elongated bracket, means for mounting said bracket on a car or the like, an elongated substantially cylindrical rod, end walls integrally formed at the ends of said elongated bracket and extending outwardly therefrom at substantially right angles, said end walls having longitudinally aligned openings rotatably mounting the ends of said rod, said rod intermediate the ends thereof having a flat cutaway portion adapted to fit a license plate to be inserted intermediate said flat cutaway portion and the outer face of said bracket, said rod having inwardly extending angular openings at each end adapted to be engaged by an angular wrench or the like, a cylinder lock mounted on the outer face of one of said end walls, a detent mounted on the inner face of said end wall and adapted to be raised and lowered by said cylinder lock, said rod having a plurality of radially spaced openings adapted to receive said detent whereby to lock the angular position of said rod.

References Cited in the file of this patent

UNITED STATES PATENTS

| | | |
|---|---|---|
| 1,575,872 | Strohl | Mar. 9, 1926 |
| 1,983,105 | Stewart | Dec. 4, 1934 |
| 1,999,344 | Simpson | Apr. 30, 1935 |
| 2,287,428 | Hopp et al. | June 23, 1942 |

FOREIGN PATENTS

| | | |
|---|---|---|
| 164,145 | Switzerland | Dec. 1, 1933 |